United States Patent
Karunakaran et al.

(10) Patent No.: US 9,548,982 B1
(45) Date of Patent: Jan. 17, 2017

(54) SECURE CONTROLLED ACCESS TO AUTHENTICATION SERVERS

(71) Applicant: MOBILE IRON, INC., Mountain View, CA (US)

(72) Inventors: Kumara Das Karunakaran, San Jose, CA (US); Nimrod Reich-Zilberman, San Francisco, CA (US); Vijay Pawar, Palo Alto, CA (US)

(73) Assignee: MOBILE IRON, INC., Mountain View, CA (US)

( * ) Notice: Subject to any disclaimer, the term of this patent is extended or adjusted under 35 U.S.C. 154(b) by 117 days.

(21) Appl. No.: 14/555,344

(22) Filed: Nov. 26, 2014

Related U.S. Application Data

(60) Provisional application No. 61/909,323, filed on Nov. 26, 2013.

(51) Int. Cl.
*H04L 29/06* (2006.01)
*H04L 29/08* (2006.01)
*H04L 29/12* (2006.01)
*H04W 12/08* (2009.01)

(52) U.S. Cl.
CPC ........... *H04L 63/10* (2013.01); *H04L 61/1511* (2013.01); *H04L 63/0815* (2013.01); *H04L 67/28* (2013.01); *H04W 12/08* (2013.01)

(58) Field of Classification Search
CPC ...... G06F 21/335; G06F 21/604; H04L 63/08; H04L 63/10; H04L 63/20; H04L 9/3213
USPC ..... 726/1–4, 21–29; 709/201–203, 217–219, 709/223–225
See application file for complete search history.

(56) References Cited

U.S. PATENT DOCUMENTS

| | | | |
|---|---|---|---|
| 8,095,961 B1* | 1/2012 | Morley | G06F 21/577 726/1 |
| 8,117,344 B2 | 2/2012 | Mendez et al. | |
| 8,713,646 B2 | 4/2014 | Stuntebeck | |
| 2003/0163730 A1* | 8/2003 | Roskind | H04L 63/083 726/5 |
| 2011/0271099 A1* | 11/2011 | Preiss | H04L 63/0807 713/155 |
| 2013/0152169 A1* | 6/2013 | Stuntebeck | H04L 67/16 726/4 |

OTHER PUBLICATIONS

Fox et al., Security on the Move: Indirect Authentication Using Kerberos, 1996, pp. 1-10.
Adam Young, Adam Young's Web Log, The Notebook of a Programmer Climber Musician Ex-Soldier, The Path to Kerberos over Port 443, May 11, 2012.

* cited by examiner

*Primary Examiner* — Beemnet Dada
*Assistant Examiner* — Kalish Bell
(74) *Attorney, Agent, or Firm* — Van Pelt, Yi & James LLP

(57) ABSTRACT

An authentication-related request sent from a mobile device to an authentication server is received at a proxy server. A posture of the mobile device is dynamically determined based at least in part on information included in the request. The request is validated based at least in part on the dynamically-determined posture. The proxy server communicates with an authentication server on behalf of the mobile device to obtain authentication information usable by the mobile device to access a service.

18 Claims, 10 Drawing Sheets

SECURE CONTROLLED ACCESS TO AUTHENTICATION SERVERS

CROSS REFERENCE TO OTHER APPLICATIONS

This application claims priority to U.S. Provisional Patent Application No. 61/909,323, entitled SECURE CONTROLLED ACCESS TO AUTHENTICATION SERVERS filed Nov. 26, 2013 which is incorporated herein by reference for all purposes.

BACKGROUND OF THE INVENTION

Demand for single-sign-on (SSO) functionality in mobile devices is increasing. Traditionally, SSO techniques, such as Kerberos-based SSO, were limited to desktop computer applications. More recently SSO techniques have been applied to mobile devices with network-level access to an authentication server, such as a Kerberos Key Distribution Center (KDC). Mobile devices, however, spend significant time disconnected from the local area network (LAN), such as a corporate network, and enterprises may elect to not expose their authentication servers to a public network. In traditional systems, when a device is not connected to an enterprise network via, for example, an enterprise Wi-Fi connection, the mobile device SSO client on a mobile device may be unable to access the authentication server.

In addition, SSO techniques are often used to provide access to enterprise resources in, for example, and mobile device management (MDM) environment. Traditional SSO authentication techniques may, however, provide limited ability for a MDM system to monitor and/or control access to authentication servers, service servers, and/or SSO functionality.

BRIEF DESCRIPTION OF THE DRAWINGS

Various embodiments of the invention are disclosed in the following detailed description and the accompanying drawings.

DETAILED DESCRIPTION

Figure 1:
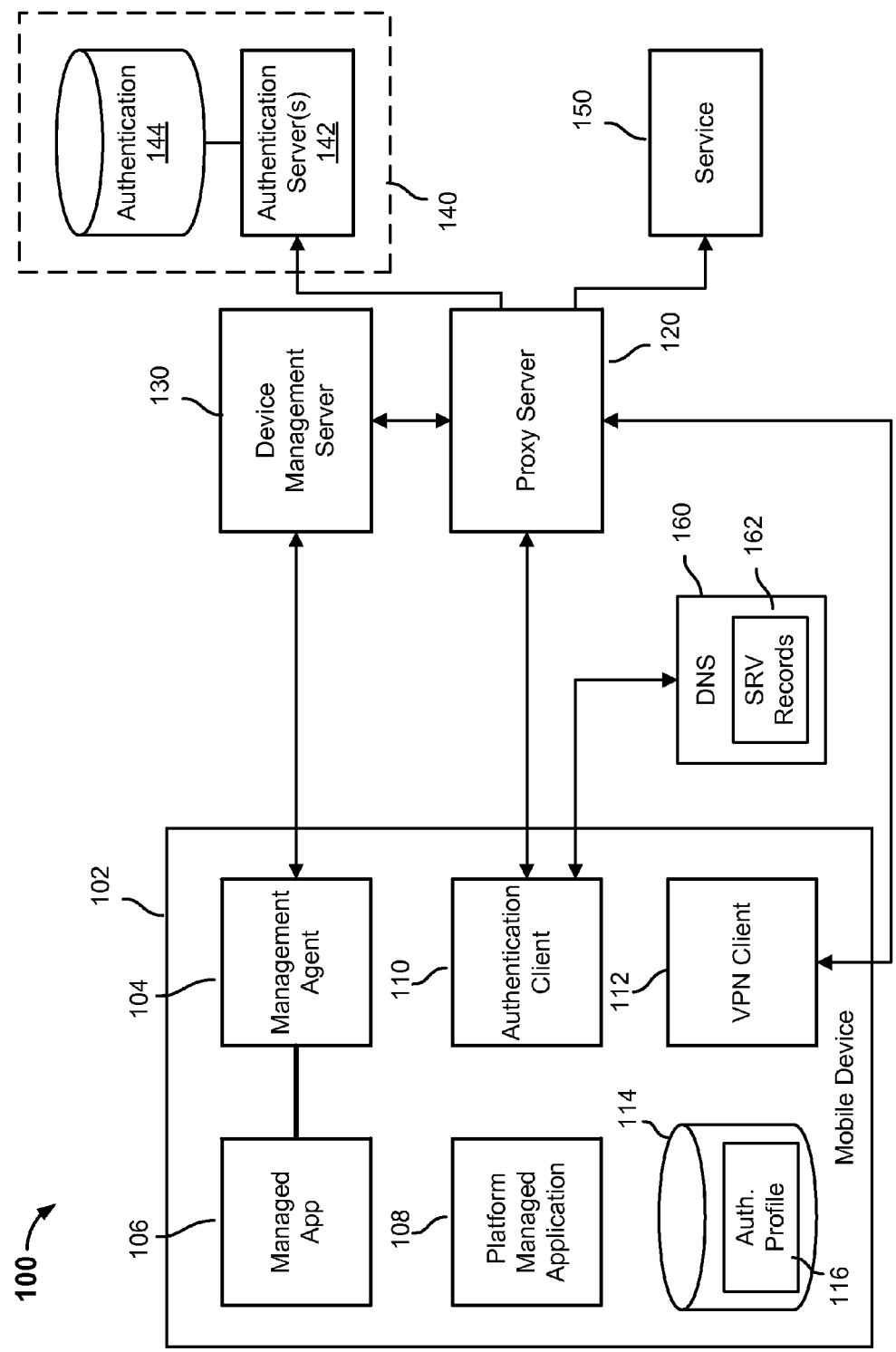
FIG. 1 is a block diagram illustrating embodiments of a system to provide access to authentication servers.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Secure controlled access to authentication servers is disclosed. In various embodiments, an authentication-related request sent from a mobile device to an authentication server is received at a proxy server. A posture of the mobile device is dynamically determined based at least in part on information included in the request. The request is validated based at least in part on the dynamically-determined posture. The proxy server communicates with an authentication server on behalf of the mobile device to obtain authentication information usable by the mobile device to access a service.

In various embodiments, the techniques disclosed herein allow a mobile device to connect to an authentication service, such as a KDC, while the device is in a public network (e.g., outside of a local network where there KDC is located). For example, a mobile device may access a KDC without establishing a device-level virtual private network (VPN) connection to an enterprise network in which the KDC is located. By not requiring the device to connect to the KDC via a device-level VPN connection, certain risks associated with providing device-level VPN access to enterprise resources may be avoided. The techniques disclosed herein also allow a device management server to monitor and control a mobile device's access to an authentication service (e.g., KDC), enterprise resources, and/or other nodes within an enterprise network.

FIG. 1 is a block diagram illustrating embodiments of a system to provide access to authentication servers. In the example shown, a system 100 includes a mobile device 102, a proxy server 120 (e.g., security enforcement node), device management server 130, and/or other components. The mobile device 102 may include a smartphone, tablet, and/or any other type of mobile device. The mobile device 102 may include a management agent 104, managed applications 106, platform managed applications 108, an authentication client 110, a virtual private network (VPN) client 112, authentication information storage 114, and/or other components. In certain cases, the mobile device 102 is configured for operation in a mobile device management (MDM) environment. The managed applications 106 may include and/or be modified to include a library, which configures the managed application 106 for use in an MDM environment by, for example, allowing the device management agent 104 to control the managed applications 106. The library may include an authentication library (e.g., single-sign-on (SSO) library) that configures the managed application 106 to authenticate with a service 150 using the techniques disclosed herein. A platform managed application 108 may include an application managed by a platform management engine (not shown). In certain cases, platform managed applications 108 are configured to use the authentication techniques disclosed herein.

In various embodiments, a mobile device 102 is configured to obtain authenticated access (e.g., SSO access) to one or more services 150 using the techniques disclosed herein. An authentication client 110 (e.g., SSO daemon) on the mobile device 102 may obtain authentication information usable to access one or more services 150. The authentication client 110 may be associated with (a component of) an operating system installed on the mobile device 102.

In some embodiments, the device management server 130 may assign and/or send authentication profiles 116 to a mobile device 102. The authentication profiles 116 may be stored in authentication information storage 114 on the mobile device 102. An authentication profile 116 may include a Kerberos profile, SSO profile, and/or other profile. The authentication profile 116 may configure and/or enable the mobile device 102 to use Kerberos authentication and/or other authentication techniques. For example, the authentication profile 116 may include information that enables Kerberos for specific realms (e.g., domains), users, applications, and/or device types. In certain cases, the authentication profile 116 may include a certificate usable to authenticate the mobile device 102 to a service without prompting and/or re-prompting the user for credentials. The authentication profile 116 may configure an authentication client 110 (e.g., SSO daemon) on the mobile device 102 to perform authentication operations (as needed and/or requested) to authenticate the applications included in the authentication profile 116 to the services located in the realms included in the authentication profile 116. In one example, an application 106, 108 on the mobile device 102 may attempt to access a service 150, and the service 150 may respond with an authentication challenge. The authentication challenge may indicate that the service 150 is configured for Kerberos authentication. In the event the service 150 is in a realm identified in the authentication profile 116 and/or the authentication challenge is directed to user in the authentication profile 116, the authentication client 110 may be configured to obtain authentication information on behalf of the application 106, 108.

In some embodiments, the authentication client 110 on the mobile device 102 may be configured to communicate with an authentication service 140 (e.g., authentication servers, a Kerberos Authentication Server) via the proxy server 120 to obtain authentication information usable by applications 106, 108 on the mobile device 102 to access various services 150. In some cases, an authentication service 140 includes a Kerberos Key Distribution Center (KDC) including, for example, authentication servers 142, ticket granting servers (not shown), an authentication database 144 (e.g., storing user principal names (UPN), service principal names (SPN), and/or other information), and/or other components. In one example, the authentication service 140 may include and/or be associated with a Microsoft™ Active Directory service. The authentication client 110 may communicate with the authentication service 140 (e.g., KDC) via the proxy server 120 to obtain service tickets usable to provide various applications on the mobile device 102 single-sign-on access to one or more services 150 within, for example, a realm. In various embodiments, multiple authentication services 140 (e.g., KDCs) may deployed, and each authentication service 140 may be associated with a separate realm. In certain cases, the proxy server 120 determines an appropriate authentication service 140 to communicate with based on the realm information included in an authentication request. For example, a proxy server 120 may identify a realm in an authentication request, and communicate with authentication service 140 associated with that realm to obtain authentication information for a mobile device 102.

An authentication client 110 may be configured to establish a connection to and/or discover an authentication service 140 using domain name system (DNS) resolution techniques. In certain cases, the DNS server 160 is configured with service records (SRV records) 162 in the public unsecured network to resolve DNS requests from the mobile device 102 to the authentication service 140 to be mapped to the proxy server 120. In certain cases, SRV records 162 configure the DNS server 160 to publish only certain protocols, such as the Kerberos Key Distribution Center Proxy (MS-KKDCP) protocol, to the external network (e.g., public network) on a port for a Kerberos realm. In this case, the authentication client 110 may use a DNS resolution technique to discover the authentication service 140 (e.g., KDC). As part of the DNS resolution process, the authentication client 110 may attempt to connect to the authentication service using various protocols including, for example, User Datagram Protocol (UDP), Transmission Control Protocol (TCP), Hypertext Transfer Protocol (HTTP), KKDCP, and/or other protocols. In certain cases, only KKDCP is published by the DNS server 160 in the external network, and the authentication client 110 determines, based, for example, on failed attempts to connect via UDP, TCP, HTTP, and/or other protocols, that the authentication requests are to be sent over KKDCP. In some cases, the authentication client 110 may be configured to include a Kerberos client and/or a KKDCP client. The KKDCP client sends authentication requests to a KKDCP proxy associated with the proxy server 120 to obtain ticket granting tickets and/or service tickets to authenticate applications 106, 108 on the mobile device 102 for access to the various services 150.

In various embodiments, the proxy server 120 receives authentication requests from the authentication client 110 and/or other component on the mobile device 102. The proxy server 120 may, for example, listen for Kerberos requests tunneled via a standard and/or open protocol over HTTP, such as KKDCP. According to some embodiments, when the proxy server 120 receives an authentication request from the authentication client 110 and/or other component on the mobile device 102, it interprets the authentication request (e.g., Kerberos message) to identify a user, a Kerberos realm, a service (e.g., protected corporate resource) for which the device 102 is attempting to get/retrieve authentication information (e.g., a ticket), and/or other information. The proxy server 120 collects this information from the request and generates a call to the device management server 130 to validate the request.

In some embodiments, a posture is dynamically determined based on the information from the authentication request. In some cases, the device management server 130 uses the user information (e.g., UPN), realm, services sought to be authenticated, certificates, and/or other information included the request to identify a mobile device 102 associated with the request, a user associated with the request, an identity of the service(s) 150 sought to be accessed, and/or other information. This information is used to dynamically determine a posture of the mobile device requesting authenticated access. The information may also be used to determine one or more policies to be applied to the dynamically determined posture and/or other information to validate the request.

In some embodiments, the dynamically determined posture includes information indicating a state of the mobile device. In various embodiments, the management agent 104, a platform management engine (not shown) associated with the operating system of the device, and/or other components monitor the state of the mobile device and provide state information to the device management server 130. State information may represent a state, configuration, functionality, and/or other attributes of the mobile device 102. The state information may include, for example, a device state (e.g., secure, unsecure, unsecure-jailbroken, etc.), application inventory information (e.g., a list of applications, an indication that malware is installed, etc.), policy enforcement state information (e.g., password policy enforcement state, a data encryption policy enforcement state, etc.), device configuration information (e.g., information indicating whether the device is configured to use Kerberos over an HTTP tunnel), and/or any other device state-related information. The device management server 130 may use the state information to generate a dynamically-determined posture for the mobile device.

In various embodiments, the dynamically determined posture may include information associated with a user of the mobile device. For example, the dynamically determined posture may include a status of user (e.g., employment status), group associations of a user, and/or other information associated with a user.

In some embodiments, it is determined whether the dynamically determined posture is compliant with one or more policies applicable to the mobile device. In the event the dynamically determined posture is not compliant with one or more policies applicable to the mobile device 102, the device management server 130 sends a command to the proxy server 120 to deny the request to obtain authentication information from the authentication service 140. In the event the dynamically determined posture is compliant with one or more policies applicable to the mobile device 102, the device management server 130 sends a command to the proxy server 120 allowing the request.

In various embodiments, the proxy server 120 obtains authentication information from the authentication service 140 on behalf of the mobile device. In certain cases, the proxy server 120 includes a KKDCP proxy that communicates with a KKDCP client on the mobile device 102 and/or a KDC 140 to obtain a ticket granting ticket and/or service tickets usable by applications on the device 102 to access various services 150. The KKDCP proxy may obtain ticket granting tickets and/or service tickets on behalf of the KKDCP client and provide the tickets to the KKDCP client (e.g., associated with an authentication client 110) on the device 102. In certain cases, the authentication client 110 (e.g., a Kerberos client associated with the authentication client) uses the service ticket to authenticate an application 106, 108 with a service 150. The authentication client 110 may, for example, provide a service ticket to a service server 150 and the service server 150 may use the service ticket to authenticate the application for access to the service.

In some embodiments, the techniques disclosed herein are used to provide single-sing-on functionality on a mobile device 102. In one example, an application 106, 108 attempts to access a service 150 and the service 150 replies with an authentication challenge that indicates the service is configured for single-sign-on authentication (e.g., Kerberos). The authentication client 110 may be configured based on the authentication profile 116 to listen for authentication challenges from certain services 150 to certain users (e.g., UPNs) and/or applications included in the profile. For example, if the service 150 is located in a realm included in the authentication profile 116, the authentication client 110 may conduct single-sign-on authentication on behalf of the application. In certain cases, the authentication client 110 may output a prompt for the user's password. Alternatively, if an authentication profile includes a certificate for the device, the user password may not be necessary. The user's password, a UPN for the user, a realm associated with the service 150, a certificate, and/or other information are sent to the proxy server 120 for delivery to the authentication server 142 associated with the KDC 140 using the techniques disclosed herein. The KDC 140 verifies the UPN, password, SPN, and/or other information with information in an authentication database 144. Once authenticated, the KDC 140 sends a ticket granting ticket to the authentication client 110 via the proxy server 120. The authentication client 110 may then send an authentication request including the ticket granting ticket, the UPN, an SPN associated with the service 150, and/or other information to a proxy server 120 for delivery to a ticket granting service associated with the KDC 140. The ticket granting service may validate the information in the request and reply with a service ticket usable to access the service. The proxy server 120 passes the service ticket to the authentication client 110, and the authentication client 110 uses the service ticket to authenticate the application 106, 108 to the service 150. At a later time that is prior to an expiration period of the ticket granting ticket, a second application 106, 108 may attempt to authenticate to the service and/or a second service associated with the same realm as the first service. An authentication challenge may be provided from the service to the application, and the authentication challenge is intercepted by the authentication client 110. Without prompting the user for login credentials, the authentication client 110 may send a request including the SPN of the service, the UPN, the ticket granting ticket, and/or other information to the KDC 140. The KDC 140 may validate the request and provide a service ticket for the service, and the authentication client 110 may use the service ticket to authenticate the application to the other service. The process may occur without any user interaction other than, for example, an initial password entry.

In various embodiments, once authenticated the applications 106, 108 on the mobile device 102 may be configured to securely communicate with and/or access the service 150 via a VPN client 112, such as a per-application VPN. The VPN client 112 may send information to the service 150 and/or receive information from the service via the proxy server 120. In this case, the proxy server 120 may continually monitor and control access to various services 150. In some embodiments, once authenticated the applications 106, 108 on the mobile device are configured to securely communicate with and/or access the service 150 via a secure communication channel (e.g., a TLS-encrypted tunnel) between the mobile device 102 and the proxy server 120.

In various embodiments, the proxy server 120, device management server 130, and/or other nodes may continuously monitor the state of the mobile device 102, a status of the mobile device user, and/or other information. A dynamically determined posture may be continuously updated based changes to the state of the device, status of the user, and/or other information. In the event that the dynamically determine posture indicates that the device and/or user is not compliant with one or more policies, the proxy server 120 may deny the mobile device 102 and/or applications 106, 108 access to services 150. The proxy server 120 may also deny subsequent authentication requests from the authentication client 110 based on the dynamically determined posture.

Figure 2:
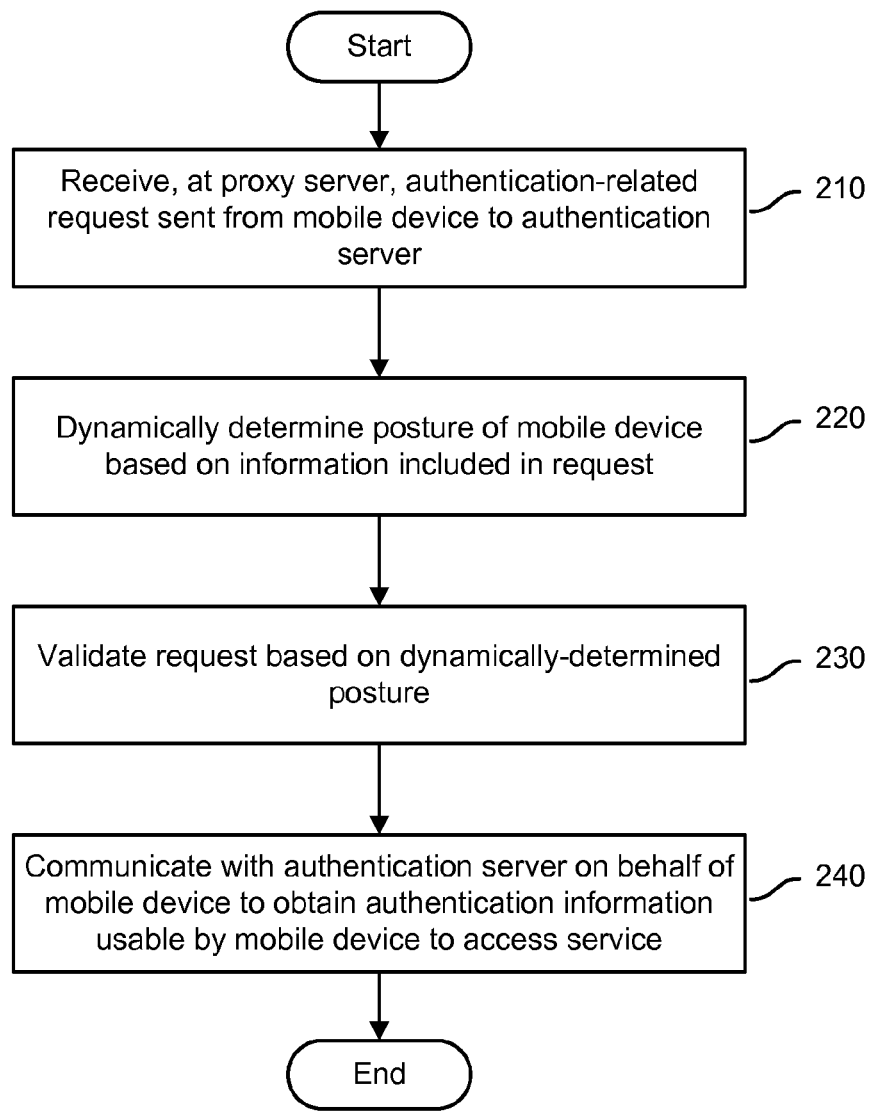
FIG. 2 is a flowchart illustrating embodiments of a process to provide access to authentication servers.

FIG. 2 is a flowchart illustrating embodiments of a process to provide access to authentication servers. In various embodiments, process 200 is performed at proxy server 120 (e.g., proxy server) of FIG. 1. At 210, an authentication-related request sent from a mobile device to an authentication server is received at a proxy server. In various embodiments, an authentication client on a mobile device sends an authentication-related request to an authentication server/service to obtain authentication information (e.g., a service ticket and/or a ticket granting ticket) usable to provide an application to access a service. In certain cases, the authentication client and/or mobile device is configured to send the request to a DNS server using a domain associated with the authentication server, and the DNS server is configured to direct the request to the proxy server. A DNS server may be configured with SRV records to resolve requests from the device to the authentication service to be mapped to the proxy server. The SRV records may also direct the authentication client to send authentication messages using a secure tunneling protocol, such as KKDCP, while the device is in the public network. In certain cases, when a mobile device is located within a protected local area network (LAN) including the authentication service, authentication requests may also be directed through the proxy server.

At 220, a posture of the mobile device is dynamically determined based on information included in the request. In various embodiments, information included in an authentication-related request may include a user identifier (e.g., UPN), a realm to which the device is seeking to be authenticated, a certificate, and/or other information. In certain cases, the information included in the request is used to dynamically determine a posture of the mobile device. The dynamically determined posture may include and/or represent a security state of the mobile device, a configuration state of the mobile device, device functionality and/or capabilities of the mobile device, a status of a user of the mobile device, and/or other information.

At 230, the request is validated based on the dynamically-determined posture. In various embodiments, policies and/or rules are applied to the dynamically determined posture to validate the request. In one example, a policy determined to be applicable to the mobile device and/or user requires the device to be configured to use Kerberos over an HTTP tunnel connection. In the event the dynamically-determined posture indicates that an authentication profile configuring the device for Kerberos over HTTP tunnel has been provided to the device, the request may be validated. In another example, a policy may require that a user be in good standing (e.g., still employed with an organization). In the event that the dynamically-determined posture indicates that the user is in good standing, the request may be validated. In certain cases, the dynamically determined posture may be non-compliant with one or more policies and the request for authentication information from the authentication service may be denied.

In some embodiments, a certificate is included in an authentication-related request. In some configurations, the certificate is used to authenticate a user without prompting the user for a password for use in, for example, an initial Kerberos request. The certificate may include device-level information that can be used to securely authenticate and validate a dynamically determined posture. For example, the certificate may include information authenticating an identity of mobile device user, and this information may be used to dynamically determine a posture of the device. In certain cases, the certificates may be used to minimize spoofing.

At 240, the proxy server communicates with the authentication server on behalf of the mobile device to obtain authentication information usable by the mobile device to access a service. In various embodiments, the proxy server operates as a proxy between the authentication client on the mobile device and an authentication service. In certain cases, the proxy server, authentication client, and/or authentication server communicate according to a secure protocol, such as the KKDCP protocol. In one example, the authentication client sends authentication-related messages to the proxy server using Hypertext Transfer Protocol over Secure Sockets Layer (HTTPS), HTTP, and/or another protocol. The proxy server may extract the authentication request, and send the authentication request to the authentication service, such as a KDC. The proxy server may send the authentication request to the authentication service using UDP, TCP, and/or another protocol. In certain cases, the proxy server communicates with the authentication client and a KDC to obtain a ticket granting ticket and/or service tickets usable by applications on the device to access various services. The proxy server may provide the authentication information (e.g., ticket granting ticket, service tickets, etc.) to the authentication client on the mobile device.

Figure 3:
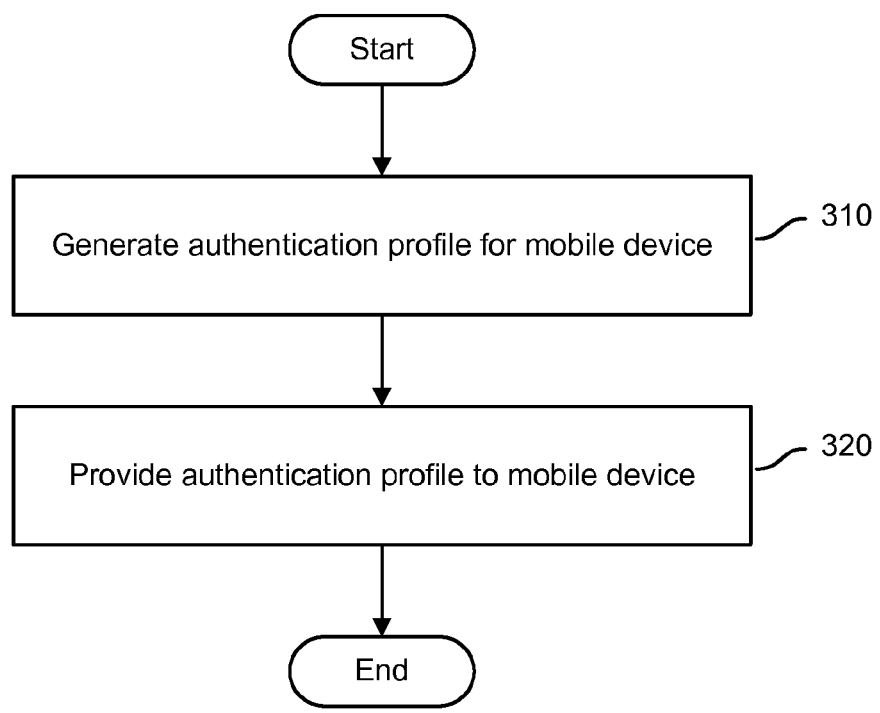
FIG. 3 is a flowchart illustrating embodiments of a process to provide an authentication profile to a mobile device.

FIG. 3 is a flowchart illustrating embodiments of a process to provide an authentication profile to a mobile device. In various embodiments, the process 300 is performed at device management server 130 of FIG. 1. At 310, an authentication profile is generated for a mobile device. In various embodiments, an authentication profile includes a single-sign-on profile for the mobile device. The authentication profile may include, for example, one or more realms, UPNs, application identifiers, certificates, a uniform resource locator (URL) with wildcards, and/or other information. A realm includes a domain for which the mobile device and/or applications installed on the mobile device is permitted to access using the techniques disclosed herein. A realm may include and/or be associated with an administrative domain, such as DOMAIN1.ACME.COM, INTRANET.ACME.COM, ENGINEERING.ACME.COM, and/or any other domain. A UPN may include a name used to refer to an account for the user of the mobile device. The application identifiers include information identifying applications that are approved to use the authentication techniques disclosed herein. The application identifiers may include, for example, bundle identifiers and/or any other types of identifiers associated with an application.

At 320, the authentication profile is provided to a mobile device. In various embodiments, a device management server provides the authentication profile to a management agent, platform management engine, and/or other component on the mobile device. In some embodiments, the authentication profile includes instructions to configure an authentication client on the mobile device to perform authentication operations on behalf of certain applications on the device as discussed in detail herein.

Figure 4:
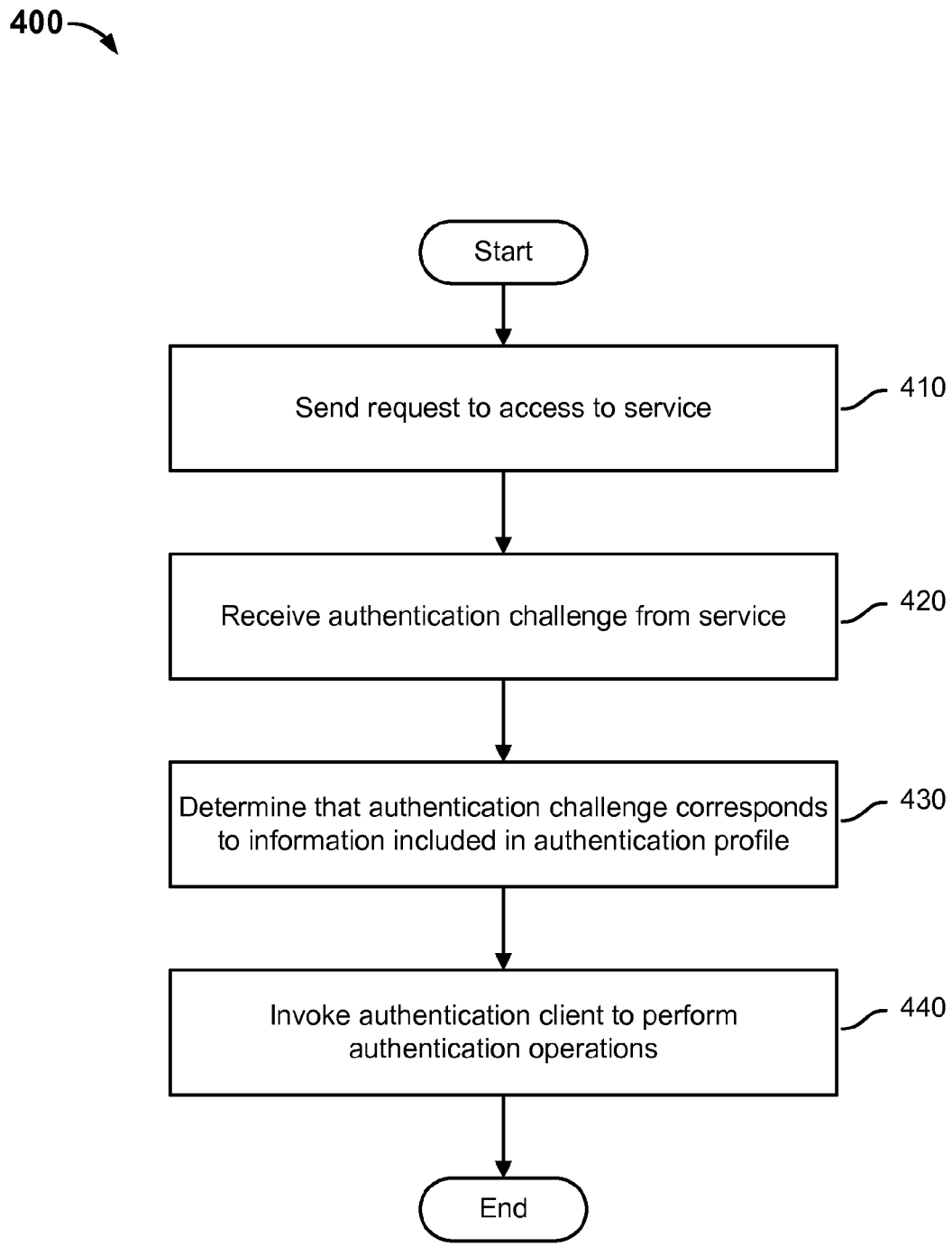
FIG. 4 is a flowchart illustrating embodiments of a process to authenticate an application on a mobile device for access to services in a realm.

FIG. 4 is a flowchart illustrating embodiments of a process to authenticate an application on a mobile device for access to services in a realm. At 410, a request is sent to access a service. In various embodiments, an application on a mobile device sends an access request to a service server. In one example, a web browser application communicates with a web server to access a web page associated with an enterprise domain, such as intranet.acme.com. In another example, a content management application, such as Sharepoint™, sends an access request to a content management service server in a certain domain.

At 420, an authentication challenge is received from the service. In various embodiments, an authentication challenge is received from a service server to which an application and/or the mobile device is attempting to connect. Continuing with the above example, a web browser application may request access to an enterprise domain (e.g., intranet.acme.com) and the web server may respond with an authentication challenge. The authentication challenge from the web server may indicate that the web server is configured to use Kerberos authentication.

At 430, it is determined that the authentication challenge corresponds to information included in the authentication profile. In various embodiments, an authentication challenge is evaluated based on an authentication profile. As discussed above, an authentication profile provided to the mobile device configures an authentication client on the mobile device to listen for certain authentication-related communications. The authentication profile may include, for example, information identifying a UPN, realms, one or more applications and/or other information. In various embodiments, an authentication client, the device operating system, and/or other component on the device evaluates authentication requests to determine whether the requests match information included in the authentication profile. In one example, the authentication challenge received from a web server includes information requesting credentials for a user jsmith@acme.com to access a domain intranet.acme.com on the context of a web browser application. The information included in the request is compared to information included in the authentication profile. The authentication profile may include a UPN of jsmith@acme.com, a realm of acme.com, and/or a list of applications that includes the web browser. In this case, it is determined that information included in the authentication challenge corresponds to information included in the authentication profile.

At 440, the authentication client is invoked to perform authentication operations on behalf of the application. In various embodiments, the authentication client (e.g., SSO daemon) communicates with authentication servers via a proxy server to obtain authentication information, such as a ticket granting ticket and/or service ticket, for an application on the device. In one example, the authentication client communicates with the authentication servers (e.g., a KDC) via the proxy server to obtain a ticket granting ticket (TGT) and/or service ticket for one or more applications on the device. The service ticket may be usable by the applications to access the service server. In various embodiments, the authentication client executes a DNS resolution operation to discover an authentication service. As discussed below, the authentication client may be directed by a DNS server to communicate with the proxy server.

Figure 5:
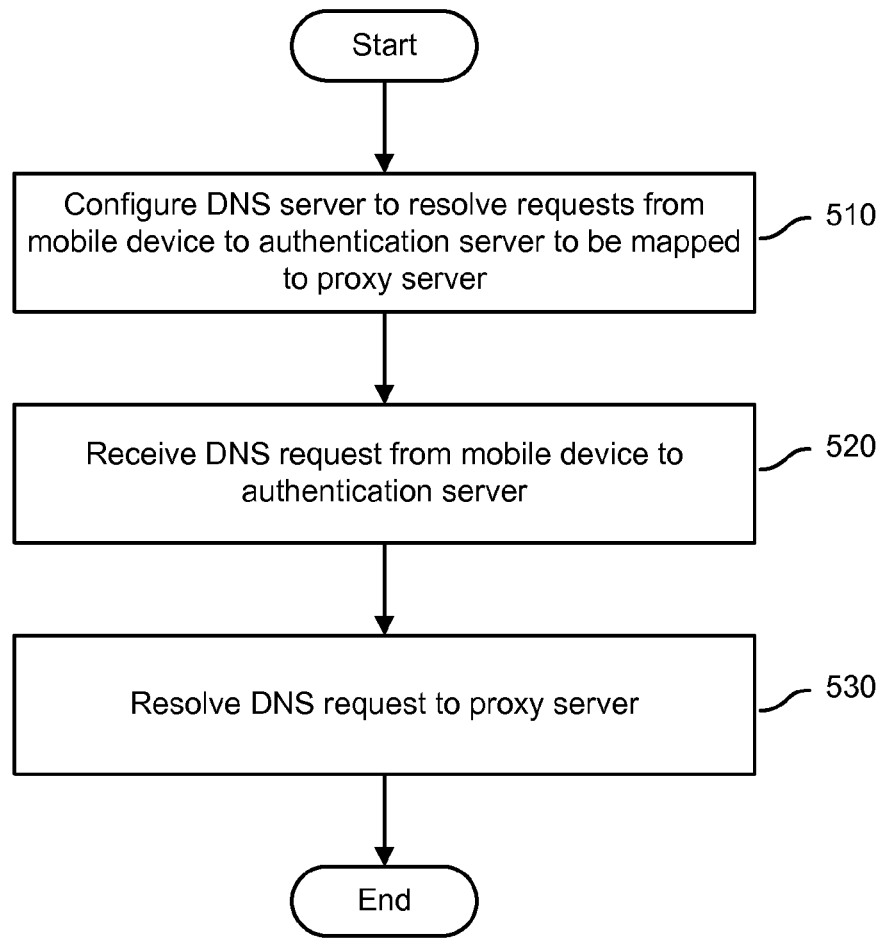
FIG. 5 is a flowchart illustrating embodiments of a process to configure a DNS server to direct authentication-related requests to a proxy server.

FIG. 5 is a flowchart illustrating embodiments of a process to configure a DNS server to direct authentication-related requests to a proxy server. At 510, DNS server(s) are configured to resolve requests (e.g., DNS resolution requests) from a mobile device to an authentication server to be directed (mapped) to a proxy server. For example, service records (SRV records) may include information that configures a DNS server to publish certain protocols on a public network and/or certain protocols on an internal network. An SRV record may include a name of a service (such as Kerberos), a type of protocol used to communicate with the service (such as KKDCP, TCP, UDP, etc.), a name of a realm (such ACME.COM), a port number on which the service listens (such as KKDCP, TCP, UDP, and/or other port), a target of the host that provides the service, a port, and/or other information. In one example, SRV records configure a DNS server (such as an external DNS server) to publish KKDCP protocol to the external network (e.g., public network) on a port for a Kerberos realm. In this case, an SRV record may include a name of service "Kerberos," a type of protocol "KKDCP," a name of a realm "ACME.COM," a port number associated with HTTPS, such as "port 1234," a target of "kerberosproxy.acme.com," and/or other information. In this case, the SRV record may configure the DNS server to point KKDCP requests to a proxy server (kerberosproxy.acme.com) within an enterprise network (acme.com). In some cases, SRV records may also configure an internal-network facing DNS server to publish UDP, TCP, and/or other protocols to the internal network.

At 520, a DNS resolution request from a mobile device to an authentication server is received. In various embodiments, a DNS server receives a DNS resolution request from a mobile device to a domain associated with an authentication server. In certain cases, the DNS resolution request may be associated with a realm and/or a protocol (e.g., the KKDCP protocol). In some cases, a mobile device (an authentication client) may attempt to connect to the authentication server using a DNS resolution technique. As discussed above, the DNS server may be configured, based on SRV records, to only publish KKDCP on an external network. Using a DNS resolution technique, an authentication client may, for example, attempt to resolve to an authentication service (e.g., a Kerberos KDC) on a UDP service port for a realm that the authentication client seeks to authenticate. The attempt to resolve to the UDP port for the realm may be unsuccessful, and the mobile device may attempt to resolve to the authentication server on a TCP service port for the realm. The attempt to resolve to the TCP port for the realm may be unsuccessful. The process of DNS resolution may repeat through various protocols (e.g., HTTP and/or other protocols) until the authentication client successfully resolves to an authentication service port for the realm. As discussed above, the DNS server may only publish Kerberos service for the realm using KKDCP on the public network. After attempting to connect using UDP, TCP, HTTP, and/or other protocols, the authentication client may determine that it can access the authentication servers (e.g., a KDC) using the KKDCP protocol.

At 530, the DNS resolution request is resolved to a proxy server. In various embodiments, the DNS server is configured to receive DNS resolution requests from a mobile device to an authentication service and resolve the requests to a proxy server. In certain cases, SRV records may include information to resolve requests from the device to an authentication server (e.g., a KDC) to be mapped to a proxy server.

Using these techniques, the mobile device is configured to send authentication messages over a tunneling protocol, such as HTTPS, to the proxy server while the device is in the public network. In one example, a KKDCP protocol is used in communications between the authentication client, the proxy server, and/or authentication servers, such as a KDC. In this case, the authentication client establishes a secure connection, such as transport layer security (TLS) tunnel, between the authentication client and the proxy server. Authentication related messages (such as a Kerberos authentication server requests) are sent over the secure channel between the authentication client and proxy server.

Figure 6:
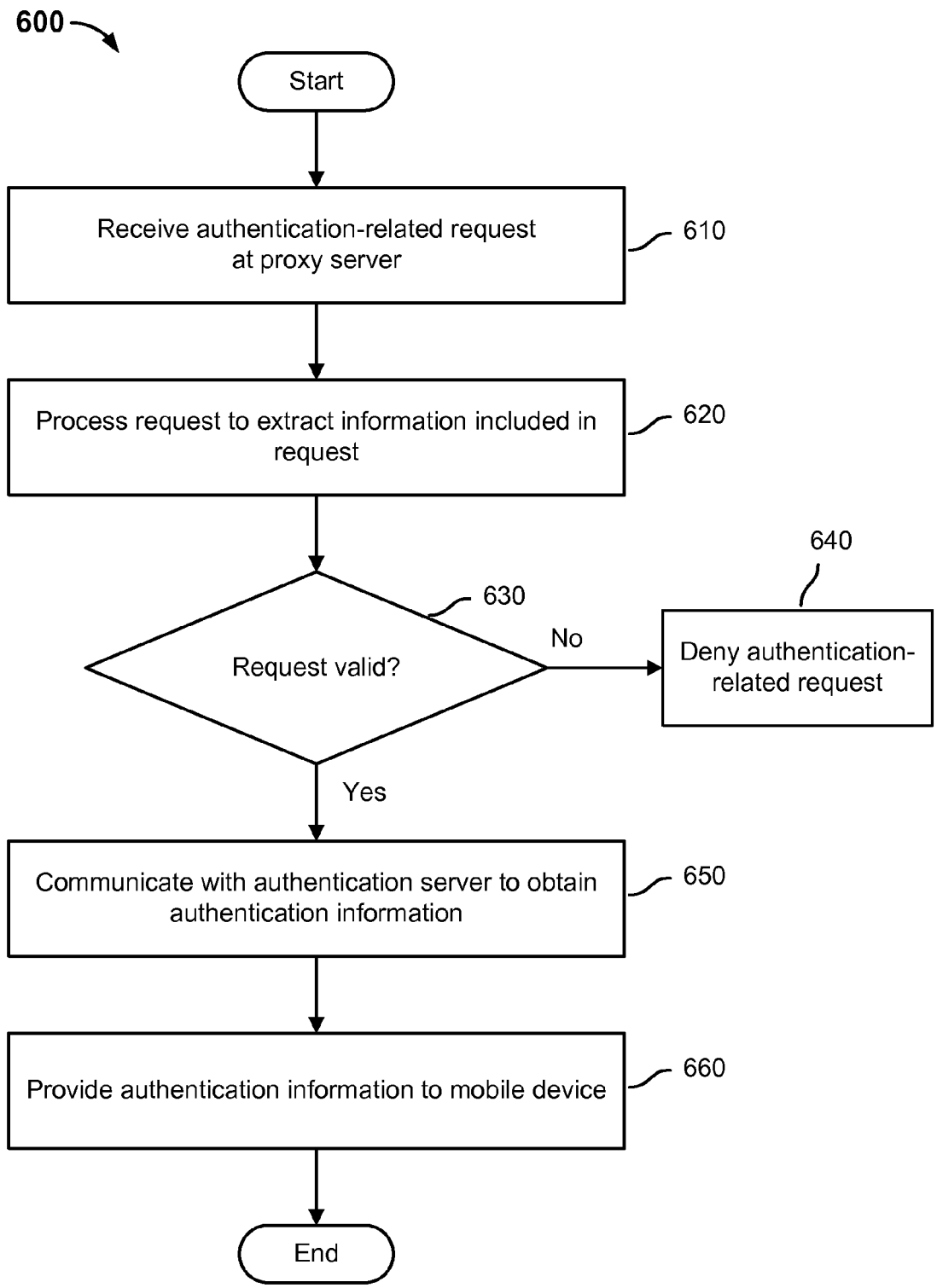
FIG. 6 is a flowchart illustrating embodiments of a process to authenticate a mobile device for access to a service.

FIG. 6 is a flowchart illustrating embodiments of a process to authenticate a mobile device for access to a service. At 610, an authentication-related request is received at a proxy server. In various embodiments, a proxy server receives an authentication request from an authentication client and/or other component of a mobile device.

At 620, the authentication request is processed to extract information included in the request. In various embodiments, an authentication request is parsed to extract information usable to validate the request. Information usable to validate the request may include, for example, information usable to evaluate the authenticity of the request, the security posture of the mobile device, the capability of the device to connect to the service, and/or any other information. In one example, a Kerberos authentication request message, such as a request for a ticket granting ticket, a request for a service ticket, etc., sent to a KDC is parsed. The Kerberos authentication message may be parsed to identify a user from a UPN included in the request, a realm associated with the request, a resource for which the authentication client is attempting to obtain authentication information, a certificate, and/or other information.

At 630, it is determined whether the request is valid. In some embodiments, the proxy server evaluates information extracted from the authentication request (such as the identity of a user, the realm/domain to which the mobile device is seeking access, the resource to which the mobile device is seeking access, and/or other information) to determine whether the request is valid. In various embodiments, the proxy server communicates with a device management server to validate the authentication request received from the mobile device. Information extracted from the authentication request may be provided to the device management server. As discussed below, the device management server evaluates the information included in the request to determine whether the request is valid. In this case, the device management server may determine whether the request is valid and send the proxy server an indication to allow and/or block the request. In the event it is determined that the request is not valid, the process proceeds to step 640. In the event it is determined that the request is valid, the process proceeds to step 650.

At 640, the authentication-related request is denied. In various embodiments, the mobile device and/or applications on the mobile device are denied access to the resources, services, and/or domains included in the authentication-related request.

At 650, the proxy server communicates with an authentication server to obtain authentication information for the mobile device. In various embodiments, a proxy server communicates with an authentication service on behalf of the mobile device and/or applications stored thereon to obtain authentication information for the mobile device. In certain cases, the authentication information includes a ticket granting ticket and/or a service ticket usable by applications on the mobile device to access a service and/or other resource.

At 660, the authentication information is provided to the mobile device. In various embodiments, the proxy server provides a ticket granting ticket, service ticket, and/or other authentication information to an authentication client on the mobile device. The authentication client may use the authentication information to authenticate one or more applications to the service server.

In some embodiments, an administrator associated with the device management server, proxy server, and/or other components may be provided access to authentication-related information. An administrator may, for example, be provided visibility into the users, applications, and/or resources being accessed using the techniques disclosed herein (e.g., Kerberos single-sign-on authentication).

Figure 7:
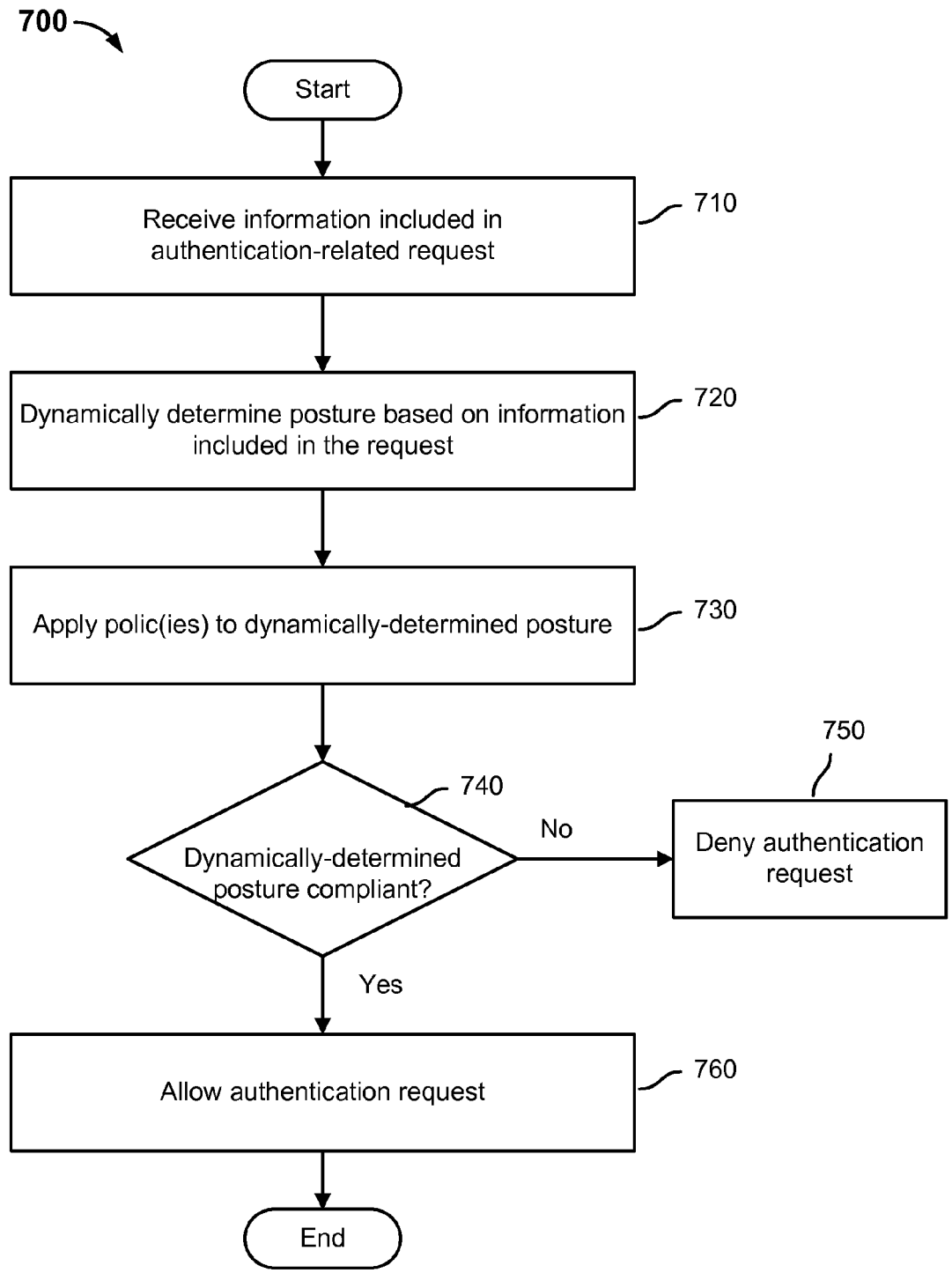
FIG. 7 is a flowchart illustrating embodiments of a process to validate an authentication request.

FIG. 7 is a flowchart illustrating embodiments of a process to validate an authentication request. In various embodiments, the process 700 is performed at device management server 130 of FIG. 1, proxy server 120 of FIG. 1, and/or any other node. At 710, information included in an authentication-related request is received. In various embodiments, a proxy server receives an authentication-related request, extracts information from the request, and/or sends the information to the device management server. In that case, the information included in the authentication request is received at the device management server. In various embodiments, an authentication-related request includes a Kerberos request such as an initial authentication request to receive a ticket granting ticket, a request for a session key, and/or any other authentication-related request. The proxy server extracts information from the authentication-related request including, for example, a user associated with the request, a Kerberos realm, a resource for which the device is attempting to obtain a service ticket, a certificate, and/or other information. This information is provided from the proxy server to a device management server.

In some embodiments, information included in the request is received at the proxy server along with the authentication request, and the steps below are performed at the proxy server and/or node associated therewith.

At 720, a posture is dynamically determined based at least in part on the information included in the request. In various embodiments, information included in an authentication request is used to determine a mobile device and/or user that is requesting authenticated access to a service. In one example, a UPN (such as jsmith@acme.com) is mapped to one or more mobile devices and/or users in a database at the mobile device management server. In some embodiments, once a mobile device is identified, a posture is dynamically determined based on state information for the mobile device, user information, and/or any other information. In some embodiments, state information associated with a mobile device may represent the state of the mobile device. In certain cases, a management agent, a platform management engine associated with the operating system of the device (not shown), and/or other components of the mobile device send state information to the device management server. The state information may include a device state (e.g., secure, unsecure, unsecure-jailbroken, etc.), application inventory information (e.g., a list of applications, an indication that malware is installed, etc.), policy enforcement state information (e.g., password policy enforcement state, etc.), and/or any other device state-related information. In some embodiments, device state information includes mobile device configuration information. Mobile device configuration information, for example, may indicate capabilities and/or functionality of a mobile device. In one example, device configuration information indicates whether a mobile device is configured to use Kerberos over an HTTP tunnel, whether a mobile device is configured to allow Kerberos for one or more realm(s) and/or resourc(es), and/or any other configurations. In some embodiments, user information may include any information regarding a user of the mobile device. In one example, user information may indicate whether the user is registered, whether the user is in good standing with an enterprise, and/or whether the user is compliant with other rules.

In various embodiments, a dynamically-determined posture of the mobile device is continuously updated as the state of the mobile device, the status of the mobile device user, device configurations, and/or other information change over time. The dynamically-determined posture of the mobile device may, for example, be determined prior to a time at which the authentication-request is received. And as discussed below, the dynamically-determined posture is continuously monitored and updated after authentication.

At 730, policies are applied to the dynamically determined posture. In various embodiments, when a mobile device and/or user associated with the request is identified based on information included in the request, the mobile device management server determines policies and/or rules applicable to the mobile device and/or user. One example policy applicable to a mobile device ensures that the user is a registered user and is in good standing. A user may be determined to be in good standing if, for example, the user is currently employed with an enterprise and/or no security-related issues have arisen in relation to the user. Another example policy applicable to a mobile device may ensure that the realm the user is attempting to talk to is allowed for the user. For example, a user in an engineering department of an organization may be authorized to access resources in a domain (realm) associated with the engineering department of an enterprise, such as engineering.acme.com, and may not be authorized to access resources in a domain associated with the marketing department, such as mktg.acme.com. A further example policy applicable to a mobile device may ensure the resource to which the mobile is attempting to authenticate is in a "white-list" for the user. In one example, a white list of protected company resources includes services that the mobile device and/or user are authorized to access including, for example, a document collaboration service, an email service, and/or any other resources. An additional example policy may ensure the devices registered by the user have the capability to use Kerberos over an HTTP tunnel. For example, a device management server may include a database of information for a mobile device, and the database may include information indicating whether the mobile device includes components which provide the capability to use Kerberos over an HTTP tunnel. Another example policy may ensure that the devices registered by a user are configured to allow Kerberos for the specified realm and/or resource. In certain cases, an authentication client on a device is configured to authenticate applications for access to resources within a realm. A device management server may communicate with the mobile device, a management agent on the mobile device, and/or a platform management engine to determine whether an authentication client on the device is configured to authenticate applications for access to resources in the realm that the mobile device is seeking to authenticate. A further example policy may ensure that the mobile device security state complies with one or more rules.

At 740, it is determined whether the dynamically determined posture is compliant. In various embodiments, policies are applied to the dynamically determined posture, information included in an authentication request, and/or other information to validate an authentication request received from the mobile device. In the event it is determined that the dynamically-determined posture is not compliant with one or more policies, the process proceeds to step 750. In the event it is determined that the dynamically-determined posture is compliant with policies, the process proceeds to step 760.

At 750, the authentication-related request is denied. The mobile device management platform may send a command to the proxy server to block the mobile device from communicating with the authentication servers. In response to the command, the proxy server blocks the mobile device and/or authentication client from communicating with the authentication servers (e.g., KDC) and/or sends a message to the mobile device indicating that the device has been blocked. In various embodiments, the mobile device and/or applications on the mobile device may also be denied access to the resources, services, and/or domains included in the authentication-related request.

At 760, the authentication-related request is allowed. In various embodiments, based on an indication that the authentication request is valid, the proxy server communicates with an authentication service to obtain authentication information for the mobile device. In certain cases, a KKDCP proxy included on the proxy server communicates with a KDC to obtain a ticket granting ticket and/or service ticket for an authentication client (e.g., a KKDCP client and/or Kerberos client) on the mobile device.

Figure 8:
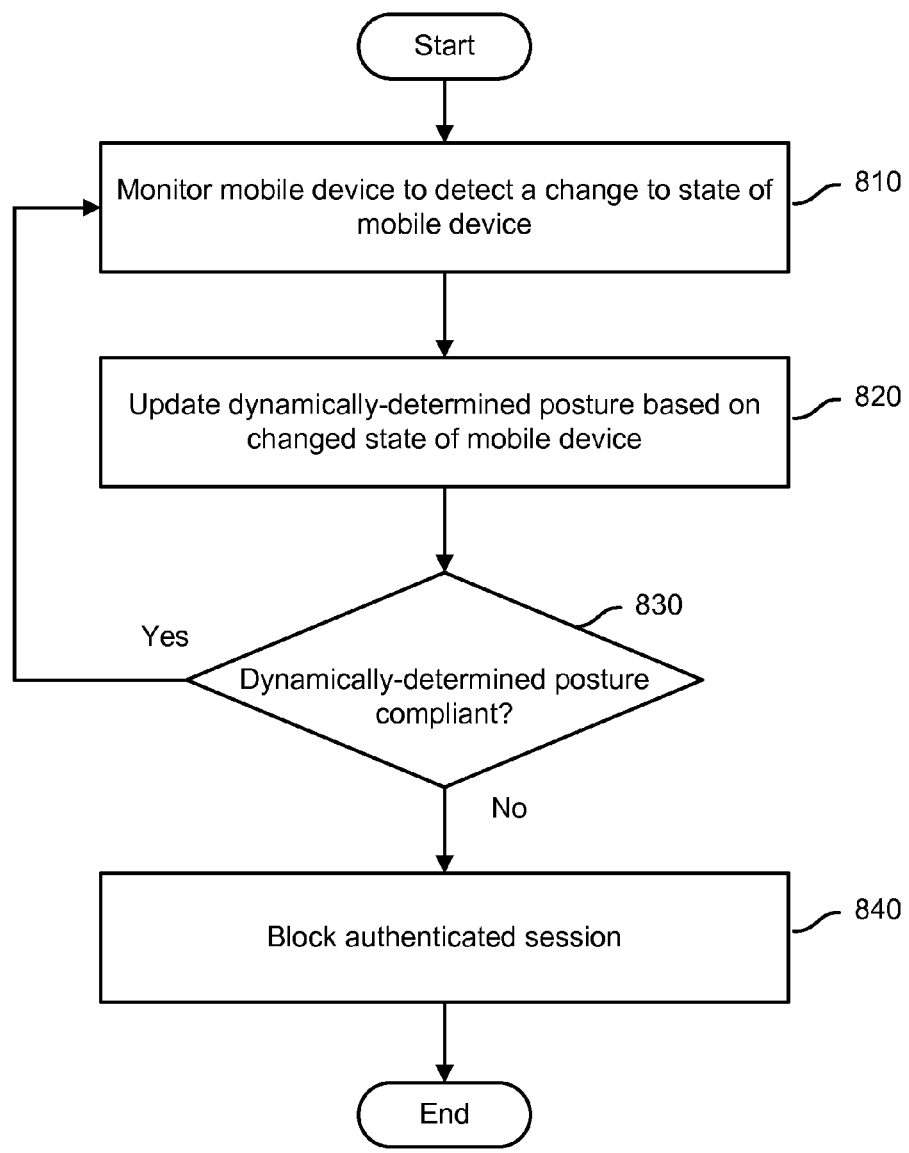
FIG. 8 is a flowchart illustrating embodiments of a process to monitor a state of a mobile device.

FIG. 8 is a flowchart illustrating embodiments of a process to monitor a state of a mobile device. In various embodiments, the process 800 is performed at device management server 130 of FIG. 1, proxy server 120 of FIG. 1, and/or any other node. At 810, a mobile device is monitored to detect a change to a state of the mobile device. In various embodiments, a device management server monitors a state of the mobile device, information associated with a user, device configuration information, and/or other information associated with a mobile device. In some cases, a device management server communicates with a management agent, a platform management engine associated with the operating system of the device, and/or other components of the mobile device to retrieve state information. The device management server may communicate with components on the mobile device periodically, at intervals, in response to triggering events, and/or at any other times to retrieve state information. The state information may include a device state, application inventory information, policy enforcement state information (e.g., password policy enforcement state, mobile device encryption policy enforcement state, etc.), device configuration information (e.g., whether the device is configured to use Kerberos over an HTTP tunnel), and/or any other device state-related information. In one example, a device may transition from a first state in which certain data protection features are enabled to a second state in which the data protection features are disabled. This change in state may be detected by a management agent on the device, and the device management server may communicate with the management agent to detect that the state has changed.

At 820, a dynamically-determined posture of the mobile device is updated based on a changed state of the mobile device. In various embodiments, a device management server updates a dynamically determined security posture to indicate a change to a state of the mobile device and/or mobile device user. In one example, a device transitions from a secure state to a jailbroken state (as detected by a management agent), and a dynamically determined security posture is updated to reflect the changed state of the mobile device. In another example, an unauthorized application is installed on a mobile, the management agent on the device detects the installation of the unauthorized application, and the management agent provides state information to the device management platform indicating that the unauthorized application has been installed. In this case, the dynamically-determined posture is updated to reflect that an unauthorized application is installed.

At 830, it is determined whether the dynamically-determined posture is compliant. In various embodiments, it is determined whether the dynamically-determined posture of the mobile device is compliant with one or more policies. In some cases, policies determined to be applicable to the mobile device are applied to the dynamically-determined posture. The policies may include any of the policies discussed herein and/or known the art. One example policy may require that the device not include any unauthorized applications. If the dynamically-determined posture indicates that the device includes an unauthorized application, the dynamically-determined posture may be determined to be not compliant with the policy. In the event the dynamically-determined posture is not compliant with a policy applicable to the device and/or user, the process proceeds to step 840. In the event the dynamically-determined posture is compliant with policies applicable to the device and/or user, the process proceeds to step 810, and the proxy server, device management server, and/or other node continues to monitor the mobile device.

At 840, an authenticated session is blocked. In various embodiments, a mobile device is blocked access to a service. The mobile device may, for example, be denied access to a service to which it was previously provided authenticated access using the techniques disclosed herein.

Figure 9:
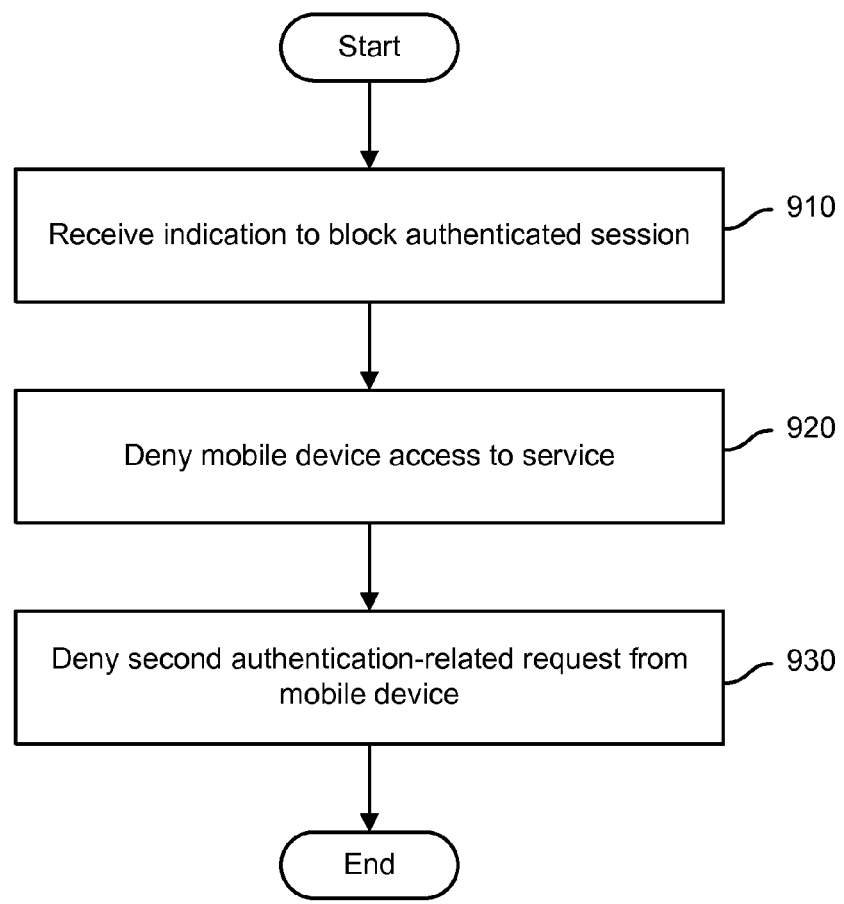
FIG. 9 is a flowchart illustrating embodiments of a process to deny a mobile device access to a service.

FIG. 9 is a flowchart illustrating embodiments of a process to deny a mobile device access to a service. In various embodiments, the process 900 is performed at proxy server 120 of FIG. 1. At 910, an indication to block an authenticated session is received. In various embodiments, a device management server determines that the dynamically-determined security posture is not compliant with one or more policies. In response to determination that the dynamically-determined posture is not compliant, the device management server sends a command to the proxy server to block one or more authentication sessions associated with the device. In various embodiments, policies are applied on a per-application, per-user, per-device and/or per-service basis to determine whether a device should be denied access to services. In some cases, the management server sends a command to block (terminate) all authenticated sessions, which are currently active. In other cases, a device management server sends commands to block access to specific services, while not blocking access to other services.

At 920, a mobile device is denied access to one or more services. In various, embodiments, a proxy server blocks access to services based on command(s) from a device management server. As discussed above, a device management server may send a command to deny access to all services (e.g., all enterprise services) and/or deny access to a set of services while allowing access to another set of services. In one example, applications on a mobile device may be authenticated to multiple services, such as a content management service (e.g., Sharepoint™) and a web server. In certain cases, applications on the device may be blocked from accessing both the content management server and the web server. In some cases, applications on the mobile device may be denied access to the content management server while still being allowed to access the web server.

In various embodiments, a proxy server denies a mobile device access to a service by blocking communications sent from the mobile device to a service server. Communications from the service server to the mobile device may also be blocked. In one example, an application communicates with a service via a proxy server by sending messages over a secure tunnel, such as a per-application VPN, a TLS connection to the proxy server, and/or other secure communication technique. In this case, the proxy server blocks communications from the mobile device to the service that are sent over the secure tunnel. In some embodiments, a proxy server denies a mobile device access to a service by communicating with a service server to end an authenticated session. In one example, the proxy server may communicate with a service server to expire an authenticated session, log the application and/or device out from an authenticated session, and/or otherwise terminate the session.

At 930, a second authentication-related request from a mobile device is denied. In various embodiments, a proxy server receives a command to deny a mobile device and/or applications on the device access to one or more services. Based on the command, the proxy server may deny any subsequent authentication-related requests. In one example, a Kerberos service ticket issued to a device may expire after a predetermined expiration period, such as eight (8) hours. After the expiration of the service ticket, a device that is blocked from accessing a service may send an authenticated-related request to a KDC via the proxy server. Based on the command to block the mobile device, the proxy server may deny the authentication related request and/or send the authentication client on the device a message indicating that the device is blocked from accessing the service.

Figure 10:
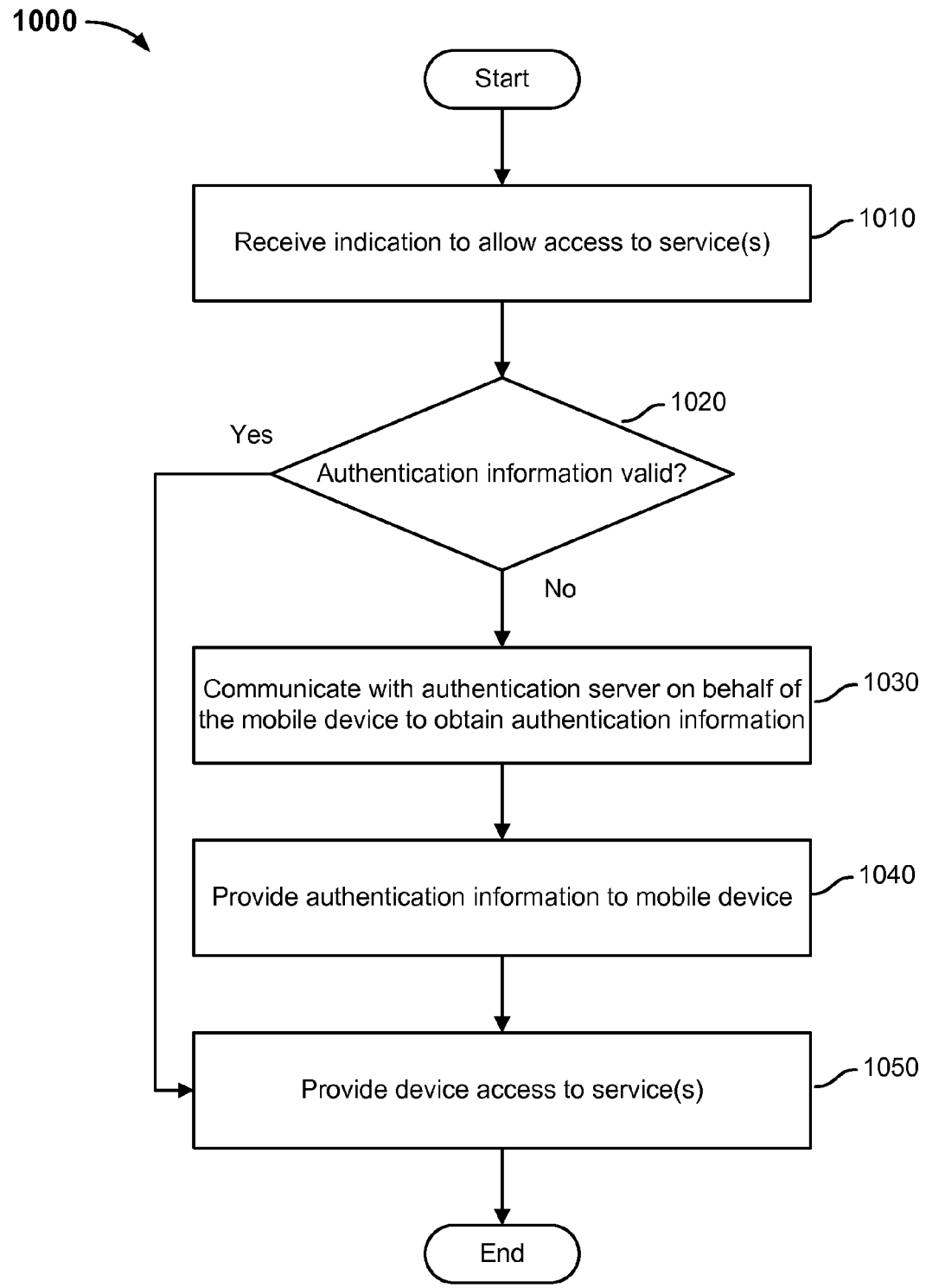
FIG. 10 is a flowchart illustrating embodiments of a process to provide a previously blocked mobile device with access to a service.

FIG. 10 is a flowchart illustrating embodiments of a process to provide a previously blocked mobile device with access to a service. In various embodiments, process 1000 is performed at proxy server 120 of FIG. 1. Process 1000 may be performed when a mobile device, mobile device user, and/or applications on a device have been denied access to various services. In certain cases, process 1000 may be performed after completion of process 900 of FIG. 9. At 1010, an indication to allow access to a service is received. In various embodiments, a mobile device and/or applications on a device are denied access to a service. While the mobile device and/or applications are blocked, an indication is received at a proxy server to allow the mobile device and/or applications to access the service. In one example, a device management server may continuously monitor a state of the mobile device and/or the mobile device user and update a dynamically-determined security posture for the device. Based on the updated dynamically-determined security posture, it may be determined that the device and/or device user has transitioned from a non-compliant state to a compliant state. The device management platform may send a command to the proxy server to allow the mobile device and/or applications stored thereon to access one or more services. In some cases, the device management platform may allow access to services on a per-application and/or per-service basis. For example, a device management platform may send a command to allow the device access to one set of services and/or to continue to block the mobile device access to another set of services.

At 1020, it is determined whether authentication information is valid. In various embodiments, the proxy server determines whether authentication information for a mobile device to access a service is valid. In some cases, a proxy server determines whether a Kerberos service ticket usable by a mobile device to access a service is expired. In certain cases, service tickets are valid for a set period of time such as, eight (8) hours. In the event the authentication information is not valid, the process proceeds to step 1030. In the event the authentication information is valid, the process proceeds to step 1050.

At 1030, a proxy server communicates with an authentication server on behalf of the mobile device to obtain authentication information. In various embodiments, the proxy server communicates with an authentication server using the techniques disclosed herein to obtain service tickets for the mobile device to access one or more services. In one example, the proxy server includes a KKDCP proxy that communicates with a KDC to obtain ticket granting ticket and/or service tickets on behalf of the authentication client on the mobile device.

At 1040, the authentication information is provided to the mobile device. In various embodiments, the proxy server provides authentication information to an authentication client on the mobile device. The authentication client may use the authentication information to authenticate applications on the mobile device for access to one or more services.

At 1050, the mobile device is provided access to one or more services. In various embodiments, a proxy server may have been configured to block communications between the mobile device and one or more services. Based on a command from the device management server indicating that the device is to be allowed to access one or more services, the proxy server may allow the mobile device to communicate with the one or more services (e.g., that were previously blocked).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, at a proxy server, an authentication-related request sent from a mobile device to an authentication server;
   communicating with a device management server to validate the request;
   dynamically determining a posture of the mobile device based at least in part on information included in the request;
   validating the request based at least in part on the dynamically-determined posture, wherein the steps of dynamically determining the posture and validating the request are performed at the device management server;
   in the event the request is determined to be invalid:
     receiving an indication that the request is not valid; and
     communicating with the authentication server on behalf of the mobile device to deny the authentication-related request from the mobile device; and
   in the event the request is determined to be valid, communicating with the authentication server on behalf of the mobile device to obtain authentication information usable by the mobile device to access a service.

2. The method of claim 1, wherein the mobile device is configured to send a domain name system (DNS) resolution request to a DNS server including a domain associated with the authentication server, and the DNS server is configured to resolve the request to the proxy server.

3. The method of claim 1, wherein dynamically determining the posture includes dynamically determining the posture of the mobile device based at least in part on one or more of user information, a realm, and the service identified in the request.

4. The method of claim 1, wherein validating the request includes:
   applying policies to the dynamically-determined posture; and
   validating the request based on a determination that the dynamically-determined posture is compliant with the policies.

5. The method of claim 1, further comprising receiving the indication from the device management server that the request is valid.

6. The method of claim 1, further comprising:
   updating the dynamically-determined security posture of the mobile device;
   determining that the updated security posture does not satisfy a policy; and
   denying the mobile device from accessing the service based at least in part on the determination that the updated security posture does not satisfy the policy.

7. The method of claim 6, wherein updating the dynamically determined security posture includes:
   detecting a change to a state of the mobile device; and
   updating the dynamically determined security posture of the mobile device based at least in part on the detected change to the state of the mobile device.

8. The method of claim 6, further comprising:
   blocking, based at least in part on the determination that the updated security posture does not satisfy the policy, a second authentication-related request sent from the mobile device to the authentication server.

9. The method of claim 6, further comprising:
   determining that the mobile device is validated to access to the service based at least in part on a subsequently updated dynamically-determined posture value for the mobile device; and
   providing the mobile device access to the service based least in part on the determination that the mobile device is validated to access the service.

10. The method of claim 1, wherein the authentication server comprises a key distribution center.

11. The method of claim 1, wherein the authentication information includes a Kerberos service ticket.

12. The method of claim 1, further comprising sending the authentication information to the mobile device, wherein the mobile device is configured to send the authentication information to the service to authenticate one or more applications with the service.

13. A system, comprising:
   a processor; and
   a memory coupled with the processor, wherein the memory is configured to provide the processor with instructions which when executed cause the processor to:
     receive, at a proxy server, an authentication-related request sent from a mobile device to an authentication server;
     communicate with a device management server to validate the request;
     dynamically determine a posture of the mobile device based at least in part on information included in the request;
     validate the request based at least in part on the dynamically-determined posture wherein the steps of dynamically determining the posture and validating the request are performed at the device management server;

in the event the request is determined to be invalid:
receive an indication that the request is not valid; and
communicate with the authentication server on behalf of the mobile device to deny the authentication-related request from the mobile device; and in the event the request is determined to be valid, communicate with the authentication server on behalf of the mobile device to obtain authentication information usable by the mobile device to access a service.

14. The system recited in claim 13, wherein the processor is configured to dynamically determine the posture of the mobile device based at least in part on one or more of user information, a realm, and the service identified in the request.

15. The system recited in claim 13, wherein the processor is configured to validate the request at least in part by:
applying policies to the dynamically-determined posture; and
validating the request based on a determination that the dynamically-determined posture is compliant with the policies.

16. A computer program product, the computer program product being embodied in a tangible non-transitory computer readable storage medium and comprising computer instructions for:
receiving, at a proxy server, an authentication-related request sent from a mobile device to an authentication server;
communicating with a device management server to validate the request;
dynamically determining a posture of the mobile device based at least in part on information included in the request;
validating the request based at least in part on the dynamically-determined posture, wherein the steps of dynamically determining the posture and validating the request are performed at the device management server;
in the event the request is determined to be invalid:
receiving an indication that the request is not valid; and
communicating with the authentication server on behalf of the mobile device to deny the authentication-related request from the mobile device; and
in the event the request is determined to be valid, communicating with the authentication server on behalf of the mobile device to obtain authentication information usable by the mobile device to access a service.

17. The computer program product recited in claim 16, wherein dynamically determining the posture includes dynamically determining the posture of the mobile device based at least in part on one or more of user information, a realm, and the service identified in the request.

18. The computer program product recited in claim 16, wherein validating the request includes:
applying policies to the dynamically-determined posture; and
validating the request based on a determination that the dynamically-determined posture is compliant with the policies.

* * * * *